(12) United States Patent
Walston et al.

(10) Patent No.: US 11,255,211 B2
(45) Date of Patent: *Feb. 22, 2022

(54) MULTI-PIECE CARRIER ASSEMBLY FOR MOUNTING CERAMIC MATRIX COMPOSITE SEAL SEGMENTS

(71) Applicants: Rolls-Royce Corporation, Indianapolis, IN (US); Rolls-Royce plc, London (GB)

(72) Inventors: Jeffrey A. Walston, Indianapolis, IN (US); Andrew Hurst, London (GB)

(73) Assignees: Rolls-Royce Corporation, Indianapolis, IN (US); Rolls-Royce plc

( * ) Notice: Subject to any disclaimer, the term of this patent is extended or adjusted under 35 U.S.C. 154(b) by 0 days.

This patent is subject to a terminal disclaimer.

(21) Appl. No.: 17/094,339

(22) Filed: Nov. 10, 2020

(65) Prior Publication Data

US 2021/0054760 A1 Feb. 25, 2021

Related U.S. Application Data

(63) Continuation of application No. 16/129,294, filed on Sep. 12, 2018, now Pat. No. 10,858,949.

(51) Int. Cl.
*F01D 11/08* (2006.01)
*F01D 25/00* (2006.01)

(52) U.S. Cl.
CPC ............ *F01D 11/08* (2013.01); *F01D 25/005* (2013.01); *F05D 2220/32* (2013.01); *F05D 2240/11* (2013.01); *F05D 2300/6033* (2013.01)

(58) Field of Classification Search
CPC ........ F01D 11/08; F01D 25/24; F01D 25/243; F01D 25/246; F05D 2220/32; F05D 2240/11; F05D 2300/6033
See application file for complete search history.

(56) References Cited

U.S. PATENT DOCUMENTS

| | | | |
|---|---|---|---|
| 6,733,233 B2 | 5/2004 | Jasklowski et al. |
| 6,821,085 B2 | 11/2004 | Darkins, Jr. et al. |
| 7,044,709 B2 | 5/2006 | Bruce et al. |
| 7,563,071 B2 | 7/2009 | Campbell et al. |
| 8,061,977 B2 | 11/2011 | Keller et al. |
| 9,163,519 B2 | 10/2015 | Kleinow et al. |
| 9,863,265 B2 | 1/2018 | Stapleton |
| 9,874,104 B2 | 1/2018 | Shapiro |
| 2005/0158168 A1 | 7/2005 | Bruce et al. |
| 2015/0218961 A1 | 8/2015 | Evans et al. |
| 2017/0002674 A1 | 1/2017 | Vetters et al. |

(Continued)

FOREIGN PATENT DOCUMENTS

| | | |
|---|---|---|
| EP | 3118417 | 1/2017 |
| EP | 3173583 | 5/2017 |

(Continued)

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A turbine shroud assembly adapted for use in a gas turbine engine includes a blade track segment and a carrier. The blade track segment includes a runner that extends circumferentially partway around a central axis and an attachment post that extends radially from the runner. The carrier is coupled with the attachment post to support the blade track segment relative to the central axis.

20 Claims, 4 Drawing Sheets

(56) References Cited

U.S. PATENT DOCUMENTS

| | | | |
|---|---|---|---|
| 2017/0016341 A1* | 1/2017 | Stapleton | ............... F01D 9/042 |
| 2017/0044920 A1 | 2/2017 | Vetters et al. | |
| 2018/0051590 A1* | 2/2018 | Tableau | ................ F01D 11/08 |

FOREIGN PATENT DOCUMENTS

| | | |
|---|---|---|
| FR | 3056632 | 3/2018 |
| FR | 3064022 | 9/2018 |

* cited by examiner

MULTI-PIECE CARRIER ASSEMBLY FOR MOUNTING CERAMIC MATRIX COMPOSITE SEAL SEGMENTS

CROSS REFERENCE TO RELATED APPLICATIONS

This application is a continuation of and claims priority to and the benefit of U.S. patent application Ser. No. 16/129,294, filed 12 Sep. 2018, the disclosure of which is now expressly incorporated herein by reference.

FIELD OF THE DISCLOSURE

The present disclosure relates generally to assemblies including ceramic matrix composite components, and more specifically to turbine shroud and other assemblies used in gas turbine engines.

BACKGROUND

Engines, and particularly gas turbine engines, are used to power aircraft, watercraft, power generators and the like. Gas turbine engines typically include a compressor, a combustor, and a turbine. The compressor compresses aft drawn into the engine and delivers high-pressure aft to the combustor. The combustor is a component or area of a gas turbine engine where combustion takes place. In a gas turbine engine, the combustor receives high-pressure aft and adds fuel to the air, which is burned to produce hot, high-pressure gas. After burning the fuel, the hot, high-pressure gas is passed from the combustor to the turbine. The turbine extracts work from the hot, high-pressure gas to drive the compressor and residual energy is used for propulsion or sometimes to drive an output shaft.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. These static shrouds may be coupled to an engine case that surrounds the compressor, the combustor, and the turbine.

Some shrouds may be exposed to high temperatures from products of the combustion reaction in the combustor. These shroud assemblies can include components made from ceramic matrix composite (CMC) materials and metallic components. Still further, these shroud assemblies can take up a lot of axial space in the turbine engine. Accordingly, a carrier assembly is needed that accommodates smaller axial spaces and avoids or minimizes coupling stresses at the interface of the CMC and metallic components.

SUMMARY

The present disclosure may comprise one or more of the following features and combinations thereof.

In some embodiments, a turbine shroud is adapted to be mounted outward of blades included in a turbine wheel assembly. The turbine shroud assembly comprises a blade track segment comprising ceramic matrix composite materials, the blade track segment including a runner that extends partway around a central axis to face a primary gas path of the gas turbine engine and an attachment feature. The shroud assembly also includes a multi-piece carrier having a forward body and an aft body comprising metallic materials and configured to be mounted to other metallic components within the gas turbine engine and coupled together at mating faces of each of the forward and aft bodies. The shroud assembly also includes a mount assembly configured to couple with the attachment feature, and having an axial stop pin that is fitted in a closed face receiver of the aft body of the multi-piece carrier and contacts a wall of the attachment feature.

In some embodiments, the attachment feature includes an eyelet formed therethrough, and the mount assembly further comprises an attachment pin that is fitted in a closed face receiver of each of the forward and aft bodies of the multi-piece carrier assemblies and extends through the eyelet and a pilot feature fitted in a closed face receiver of the aft body of the multi-piece carrier and configured to align with and extend into a receiver in the forward body of the multi-piece carrier.

In some embodiments, the pilot feature further is configured to contact the receiver of the forward body of the multi-piece carrier prior to the attachment pin contacting the closed face receiver of the multi-piece carrier during installation. The pilot feature extends a distance from the mating face of the aft body that is shorter than a distance that the attachment pin extends from the mating face of the aft body. The pilot feature has a diamond-shaped or close-tolerance cross-section.

According to some embodiments, the mating faces of the forward and aft bodies are each planar. The shroud further includes a fastener that couples and extends through openings in the forward and aft bodies. A helical insert is configured to be press fit into the opening in the aft body and to receive and contact the fastener.

In some embodiments the attachment pin is fitted in the closed face receiver of the forward an aft bodies and the eyelet in one of a close tolerance, tight limit, or press fit attachment.

According to another embodiment an assembly adapted for use in a gas turbine engine comprises a blade track segment having an attachment feature, a multi-piece carrier having a first body and a second body configured to be mounted to the blade track segment, and a mount assembly including an axial stop pin that is fitted in, and extends from the second body of the multi-piece carrier and contacts a wall of the attachment feature.

In some embodiments, the attachment feature comprises an eyelet, and the mount assembly further comprises an attachment pin that is positioned in a closed face receiver of each of the first and second bodies of the multi-piece carrier and extends through the eyelet. The attachment pin is fitted in the closed face receiver of the first and second bodies and the eyelet in one of a close tolerance, tight limit, or press fit attachment.

In some embodiments, the mount assembly further comprises a pilot feature fitted in a closed face receiver of the second body of the multi-piece carrier and configured to align with and extend into a receiver in the first body of the multi-piece carrier. The pilot further is configured to contact the receiver of the first body of the multi-piece carrier prior to the attachment pin contacting the closed face receiver of the multi-piece carrier during installation. The pilot feature extends a distance from a mating face of the second body that is shorter than a distance that the attachment pin extends from the mating face of the second body. The pilot feature comprises a dowel pin that has a diamond-shaped or close-tolerance cross-section.

In some embodiments, the assembly includes a fastener that couples and extends through openings in the first and second bodies. A helical insert is configured to be press fit into the opening in the aft body and to receive and contact the fastener.

According to an aspect of the present disclosure, a turbine shroud includes a blade track segment, a carrier, and a mount assembly. The blade track segment includes a runner and a first attachment post. The runner extends circumferentially partway around a central axis. The first attachment post extends radially outward from the runner. The carrier includes a first body and a second body coupled together and the carrier is coupled with the first attachment post to support the blade track segment relative to the central axis. The mount assembly includes an axial positioning member. The axial positioning member is engaged with the second body of the carrier and abuts a radially extending and axial facing wall of the first attachment post of the blade track segment to maintain axial spacing between the first body, the second body, and the blade track segment.

In some embodiments, the mount assembly further includes an attachment pin. The attachment pin extends axially through the first attachment post.

In some embodiments, the axial positioning member extends substantially axially away from the second body to abut the radially extending and axial facing wall of the first attachment post. In some embodiments, the axial positioning member is circumferentially aligned with the attachment pin.

In some embodiments, the first body is formed to define a first seal channel that opens radially inwardly and extends circumferentially in the first body. The second body is formed to define a second seal channel that opens radially inwardly and extends circumferentially in the second body. In some embodiments, the axial positioning member is received in the second body.

In some embodiments, the axial positioning member includes an axial stop pin. In some embodiments, the first body and the second body are coupled together at mating faces of the first body and second body. In some embodiments, the blade track segment further includes a second attachment post that extends radially from the runner and the second attachment post is spaced apart circumferentially from the first attachment post.

According to an aspect of the disclosure, a turbine shroud includes a blade track segment, a carrier, and a mount assembly. The blade track segment includes a runner and an attachment post. The runner extends circumferentially partway around a central axis. The attachment post extends radially from the runner. The carrier is coupled with the attachment post to support the blade track segment relative to the central axis. The carrier includes a first flange that extends radially inward toward the central axis and a second flange that extends radially inward toward the central axis. The second flange is spaced apart axially from the first flange to locate the attachment post included in the blade track segment axially between the first flange and the second flange. The mount assembly includes an axial positioning member that engages the carrier and abuts a radially extending and axial facing wall of the attachment post of the blade track segment to axially locate the blade track segment relative to the carrier.

In some embodiments, the axial positioning member engages the second flange. The axial positioning member extends substantially axially away from the second flange to abut the radially extending and axial facing wall of the attachment post.

In some embodiments, the mount assembly further includes an attachment pin that extends axially through the attachment post. The axial positioning member extends only partway circumferentially about the central axis. The axial positioning member is aligned circumferentially with the attachment pin.

In some embodiments, the first flange is formed to define a first seal channel that opens radially inwardly and extends circumferentially in the first flange. The second flange is formed to define a second seal channel that opens radially inwardly and extends circumferentially in the second flange.

In some embodiments, the attachment post defines an eyelet. The eyelet extends axially through the attachment post.

In some embodiments, the mount assembly further includes an attachment pin that extends axially through the attachment post and into the carrier to couple the blade track segment with the carrier. In some embodiments, the attachment pin extends into the first flange and into the second flange.

In some embodiments, the axial positioning member includes an axial pin. The axial pin engages the carrier and abuts the radially extending and axial facing wall of the attachment post of the blade track segment. In some embodiments, the axial pin is received in the second flange of the carrier.

In some embodiments, the carrier includes a first body and a second body coupled together at mating faces of the first body and second body. The first body includes the first flange and the second body includes the second flange. In some embodiments, the blade track segment includes another attachment post spaced apart circumferentially from the attachment post.

These and other features of the present disclosure will become more apparent from the following description of the illustrative embodiments.

DETAILED DESCRIPTION OF THE DRAWINGS

Figure 1:
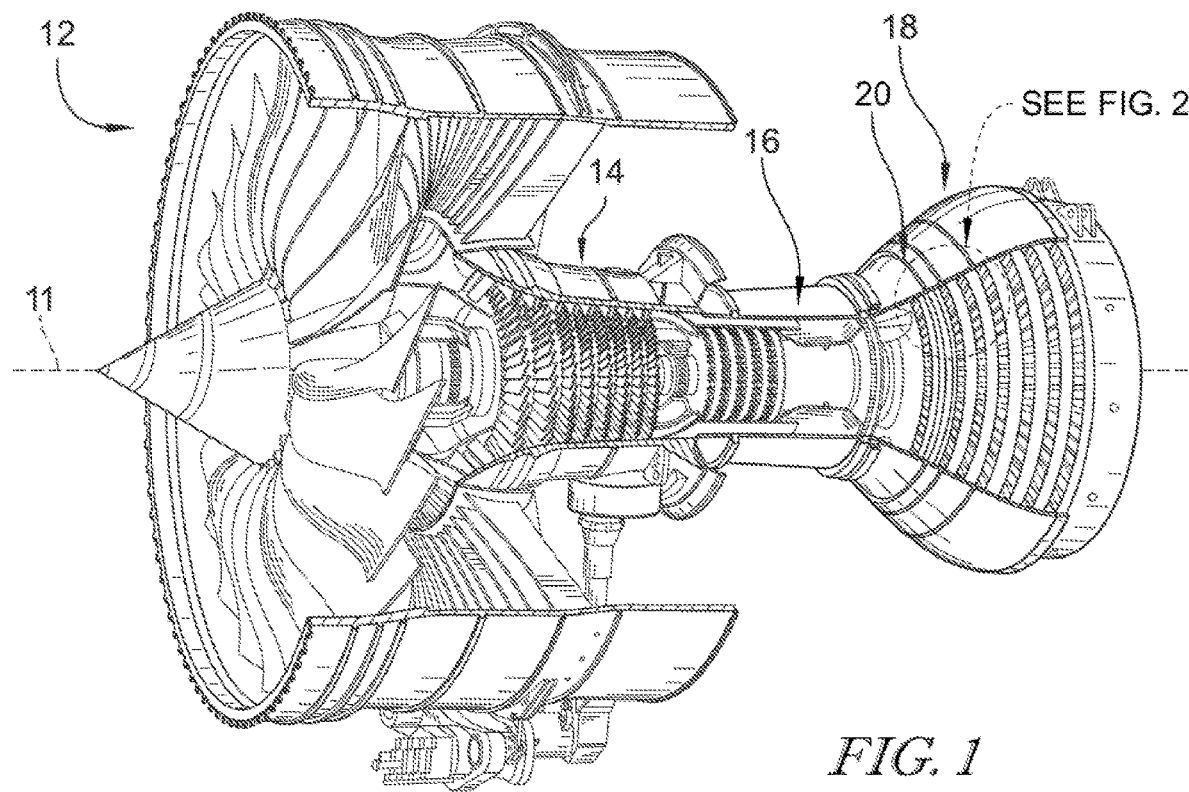
FIG. 1 is a perspective cut-away view of a turbine engine showing that the engine includes a turbine arranged aft of a compressor, and a combustor to receive hot, high pressure air produced in the compressor and combustor.

For the purposes of promoting an understanding of the principles of the disclosure, reference will now be made to a number of illustrative embodiments illustrated in the drawings and specific language will be used to describe the same.

The arrangement of an illustrative gas turbine engine 10 is shown in FIG. 1. The gas turbine engine 10 includes a fan 12, a compressor 14, a combustor 16, and a turbine 18. Fan 12 is driven by turbine 18 and provides thrust for propelling an air vehicle. The compressor 14 compresses and delivers air to the combustor 16. Combustor 16 mixes fuel with the compressed air and ignites the fuel. The hot, high-pressure products of the combustion reaction are directed into the turbine 18 to cause the turbine 18 to rotate about central axis 11 to drive compressor 14 and fan 12.

Figure 2:
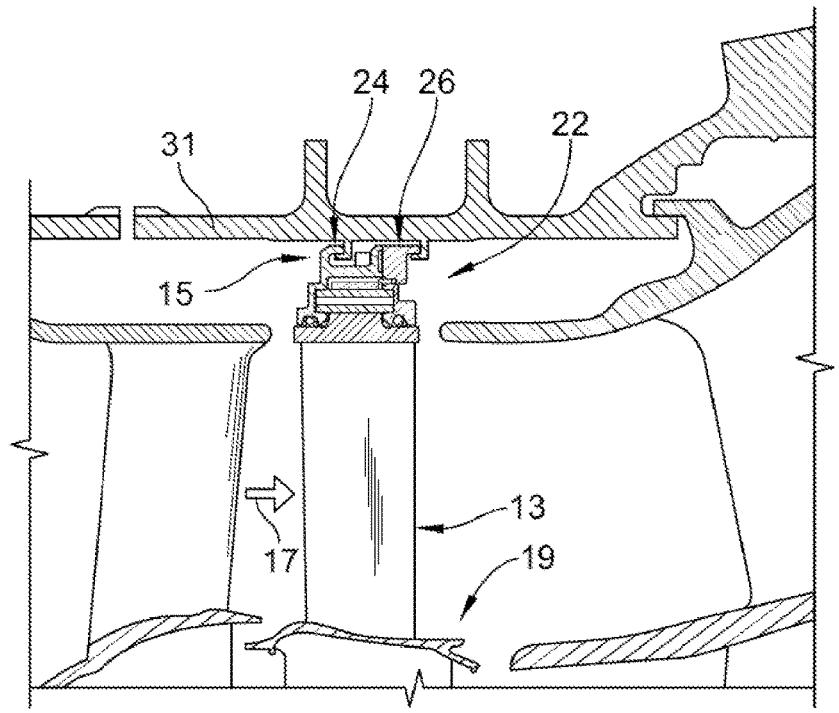
FIG. 2 is a sectional view of a portion of the turbine of FIG. 1 showing a turbine and a radially spaced turbine shroud.

Turbine 18 includes at least one turbine wheel assembly 19, and a turbine shroud 20 positioned to surround the turbine wheel assembly 19 as shown in FIGS. 1 and 2. The turbine shroud 20 is coupled to outer case 31 of the gas turbine engine. The turbine wheel assembly 19 includes a plurality of blades 13 coupled to a rotor disk for rotation therewith. The hot, high-pressure combustion products from the combustor 16 are directed toward blades 13 along flow path 17 and push the blades 13.

Figure 4:
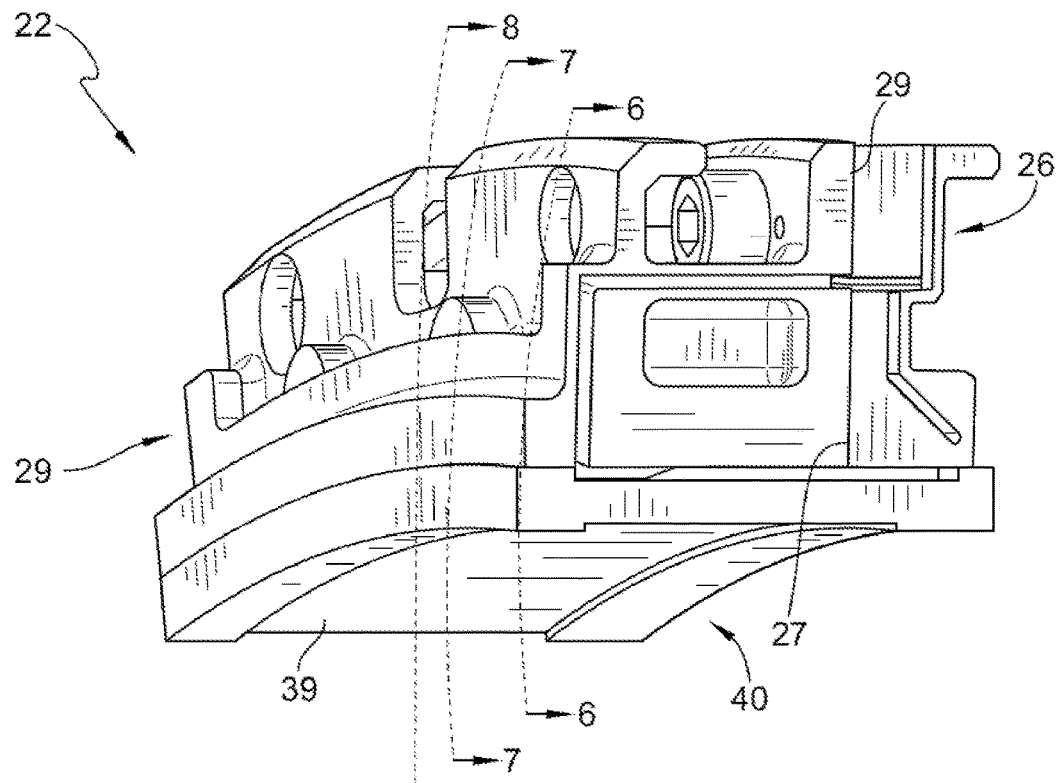
FIG. 4 shows a perspective view of an assembled turbine shroud of FIGS. 2-3.
Figure 5:
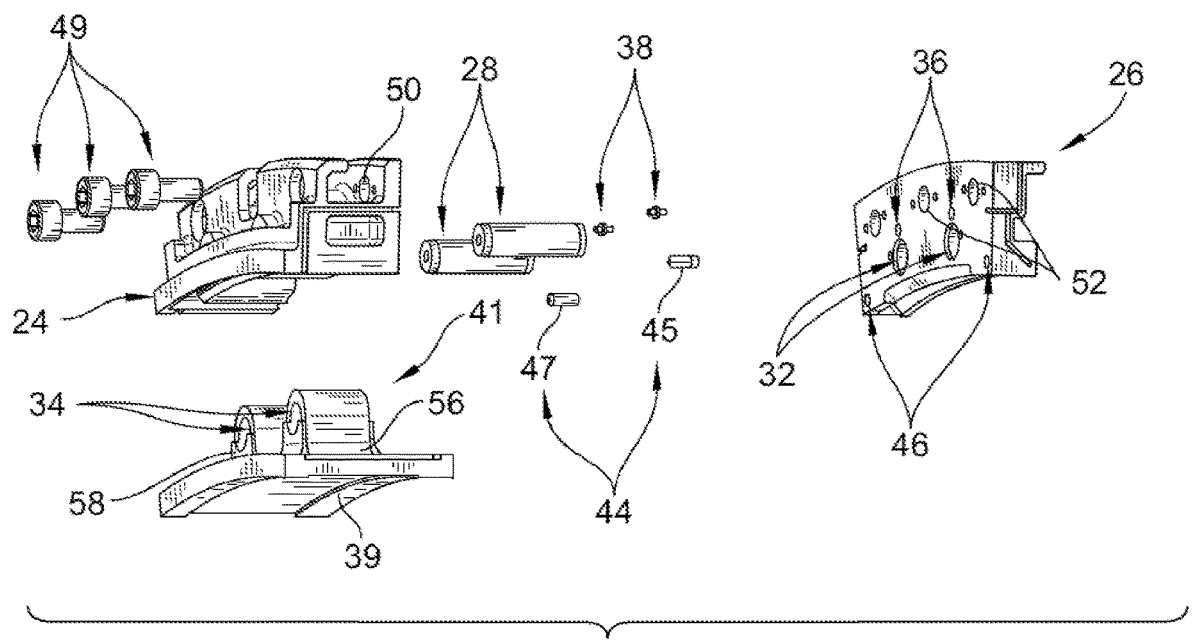
FIG. 5 is an exploded assembly view of the turbine shroud segment of FIG. 4 showing that a mount assembly of the turbine shroud segment includes fore and aft bodies of the multi-piece carrier, attachment pins, axial stop pins, and pilot features.

The turbine shroud 20 extends around the turbine wheel assembly 19. Turbine shroud is made up of a number of shroud segments 22, as shown in FIGS. 4 and 5, for example. Each segment 22 extends part-way around the central axis and cooperate to surround the turbine wheel assembly 19. Shroud segments 22 are sealed against one another, such as by strip seal members, to provide a continuous turbine shroud 20.

Figure 3:
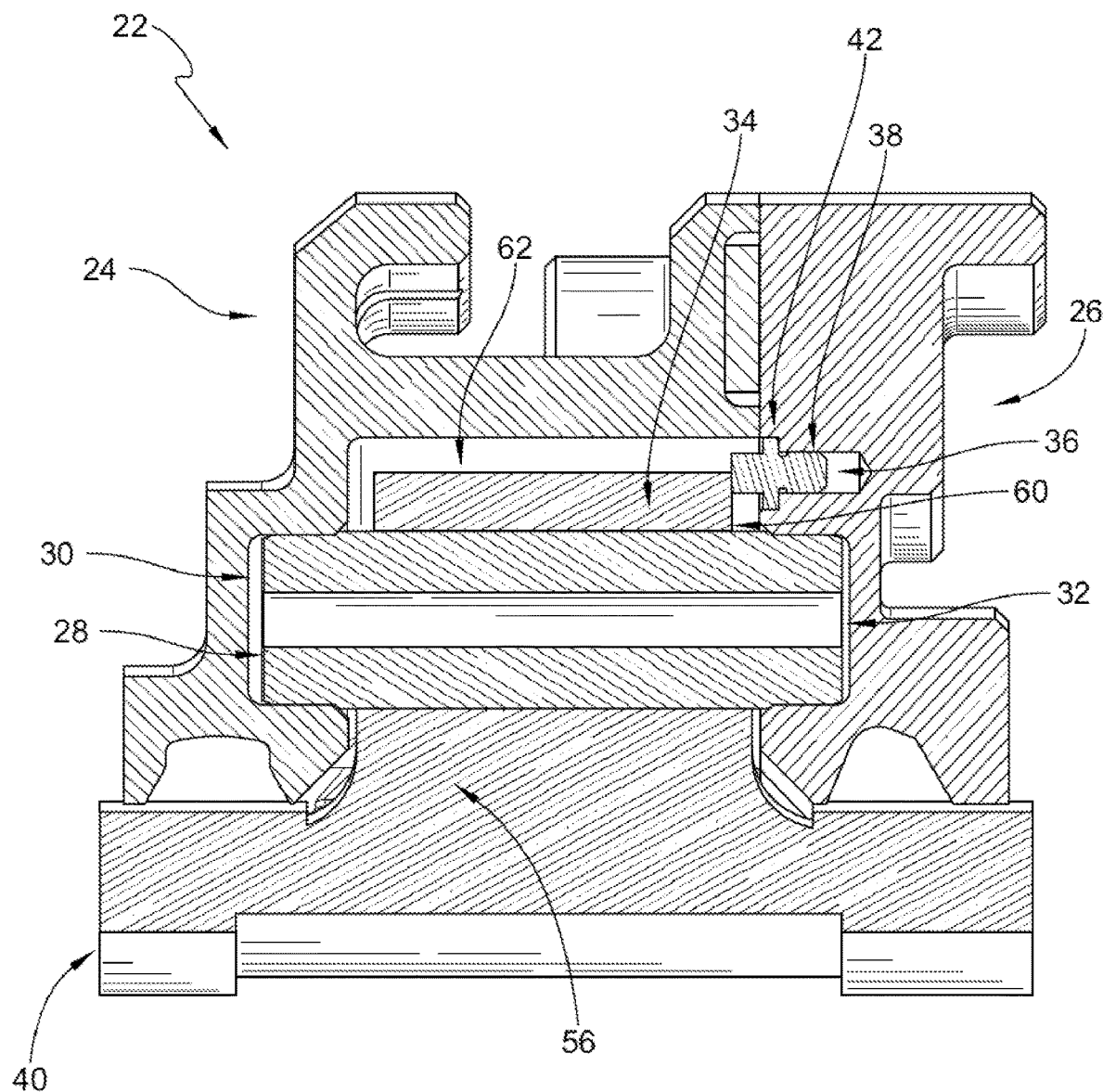
FIG. 3 is an enlarged view of the turbine shroud of FIG. 2 showing a multi-piece carrier, a blade track segment, and a mount assembly coupling the multi-piece carrier and the blade track segment.

Each shroud segment 22 includes a blade track segment 40, a multi-piece carrier 25 and a mount assembly 15 that couples the blade track segment to the multi-piece carrier 25 as shown in FIGS. 3-5. Blade track segment 40 is a ceramic matrix composite component configured to directly face the high temperatures of the primary has path. Blade track segment 40 is formed to include a runner 39 and an attachment feature 41. The attachment feature 41 is defined to include two attachment posts 56, 58 positioned circumferentially spaced apart from one another and extending radially out from an exterior surface of the runner 39. The attachment posts 56, 58 are extend parallel to each other and are positioned part-way across the runner 39 in an axial direction. Each attachment post 56, 58 is formed to include an axially-extending eyelet 34. In an alternative embodiment, the attachment feature may be a hanger to couple to the fore and aft bodies of the multi-piece carrier 25 as part of a hanger system. Additionally, other attachment features and configurations can be used.

Multi-piece carrier 25 is a metallic support component configured to interface with other metallic components spaced from the primary gas path of the engine 10. The multi-piece carrier assembly 25 includes a first body 24 and second body 26 located axially aft the first body 24. Alternatively, the multi-piece carrier 25 may comprise circumferentially adjacent first and second bodies 24, 26 that are attached with the features mount assembly and attachment features disclosed in FIGS. 3-5. The mount assembly includes one or more attachment pins 28, axial stop pins 38 and pilot features 44.

As shown in FIGS. 3 and 5, fore body 24 is formed to include a plurality of blind holes, or closed-faced receivers 30 spaced circumferentially about the fore body 24 sized to receive one end of an attachment pin 28. Aft body is formed to include a plurality of blind holes, or closed-faced receivers 46 spaced circumferentially about the aft body 26 and sized to receive an opposite end of an attachment pin 28. Aft body 26 may further be formed to include additional blind holds including pilot feature receivers 46 and stop pin receivers 36. Fore and aft bodies 24, 26 have planar mating surfaces 29, 27 to be press fit in confronting relation when assembled as shown in FIG. 4.

In illustrative embodiments, as shown in FIG. 3, each eyelet 34 of the blade track segment 40 is sized to receive a respective attachment pin 28. Attachment posts 56, 58 are located so that each eyelet 34 is axially aligned with a closed-faced receiver 30, 32 in each of the fore and aft bodies 24, 26 of the multi-piece carrier 25. Attachment pin 28 extends from aft body receiver 32 through eyelet 34 and into fore body receiver 30 in an assembled state. Axial stop pin 38 extends from aft body stop pin receiver 36 into an open cavity 62 of the fore body 24 that receives the attachment posts 56, 58. Axial stop pin 38 abuts a wall 60 of a post 56 located radially exterior to the eyelet 34 and attachment pin 28. Axial stop pin 38 may include a stop platform 42 received in the aft body receiver 36 to prevent the pin from extending further into the aft body receiver 36, and have a length to maintain appropriate axial spacing between the fore body 24, the aft body 26 and the blade track segment 40.

As illustrated in FIGS. 3-5, none of the attachment pins 28, the axial stop pins 38, or pilot features 44 of the mount assembly 15 extend completely through the fore body 24 or aft body 26 of the multi-piece carrier 25. Each attachment pin 28, axial stop pin 38 and pilot feature 44 is positioned entirely within cavity 62 formed by coupling the fore body 24, the aft body 26 and the blade track segment 40.

In some embodiments, the mount assembly 15 further includes pilot features 44 spaced circumferentially about the shroud segment 22 to provide alignment during assembly. Pilot features may be a close tolerance dowel pin 47 or a diamond head dowel pin 45 as shown in FIG. 5 or some combination of both. Diamond head dowel pin 45 has a diamond shaped cross section and is oriented with the largest radius or axis of the diamond oriented parallel to the engine radial direction so that the pilot feature 44 will provide precise radial alignment of the forward and aft bodies 24, 26 of the multi-piece carrier 25. Diamond head dowel pin 45 provides precise radial alignment while tolerating a larger mismatch in circumferential alignment, which allows the multi-piece carrier 25 to be machined to looser tolerances in the circumferential direction and adds assembly tolerance of differential thermal growth of the forward and aft bodies 24, 26.

Figure 6:
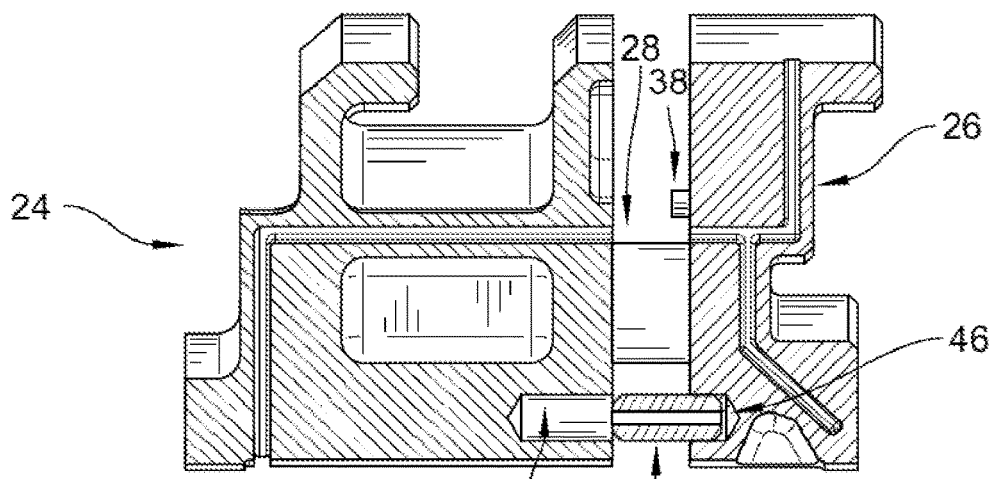
FIG. 6 is a sectional view taken along line 6-6 of FIG. 4 showing the pilot feature and the pilot receiver in the fore body of the multi-piece carrier, the pilot receiver in the fore body and the closed face receiver in the aft body.
Figure 7:
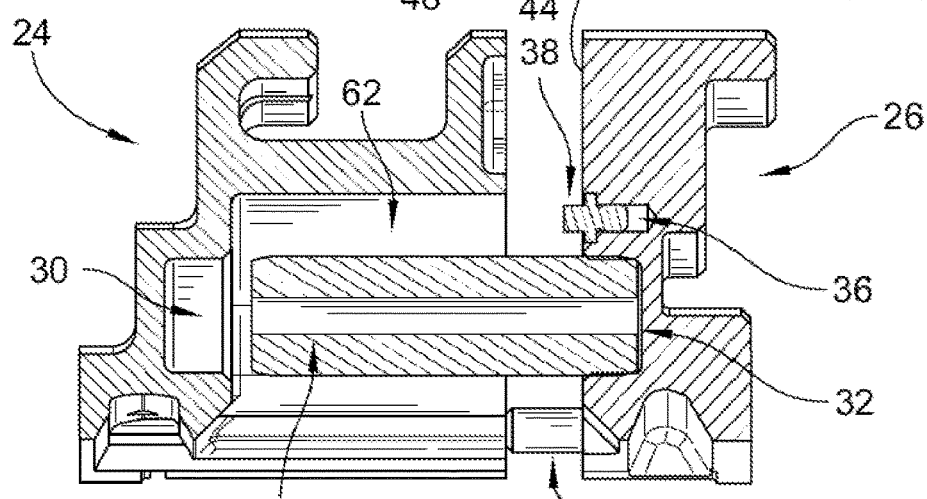
FIG. 7 is a sectional view taken along 7-7 of FIG. 6 showing the pilot feature contacts the pilot receiver prior to the attachment pin contacting the receiver during assembly of the shroud.

FIGS. 6 and 7 illustrate the relative position of pilot feature 44 relative to attachment pin 28 and axial stop pin 38 during assembly of the fore and aft bodies 24, 26. For the purposes of clarity blade track segment 40 is not shown, but would be positioned in cavity 62 as shown in FIG. 3. One end of pilot feature 44 extends into aft pilot receiver 46 of aft body 26 and an opposite end extends into pilot receiver 48.

Pilot feature 44 may be press fit into aft pilot receiver 46 for assembly and mating of the fore and aft bodies 24, 26 of the multi-piece carrier 25. Attachment pin 28 and axial stop pin 38 may also be press fit or otherwise mounted to respective aft body receivers 36, 32. In this embodiment, axial stop pin 38 extends the shortest relative distance axially from the mating face 27 of the aft body 26. Attachment pin 28 extends the longest relative distance axially from the mating face 27 of the aft body 26. Pilot feature 44 extends a length from the mating face 27 of the aft body 26 that is shorter than the attachment pin 28 and longer than the axial stop pin 38. As seen in FIGS. 6 and 7, pilot feature 44 will be the first to contact the fore body 24 at the pilot receiver 48 to align the aft body 26 and fore body 24 during coupling, while the attachment pin 28 is axially spaced from the receiver 30.

Figure 8:
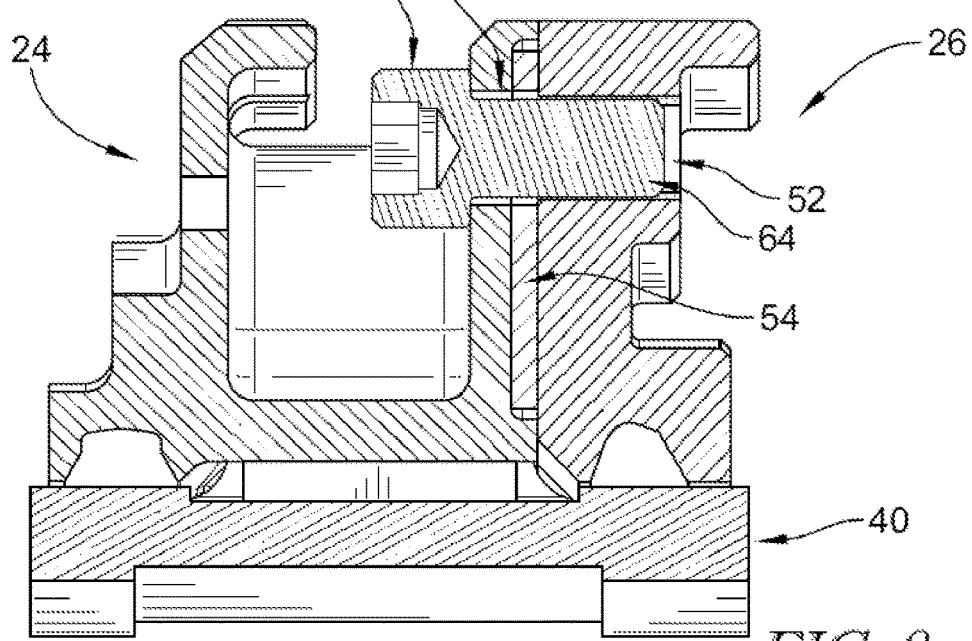
FIG. 8 is a sectional view taken along 8-8 of FIG. 6 showing a fastener extending through an opening in the fore and aft bodies of the carrier.

FIG. 8 shows an exemplary fastening mechanism for fastening the fore body 24 to the aft body 26 once the shroud segment 22 is assembled. Fastener 49, such as a bolt or screw may extend through an opening 50 in the fore body 24 that aligns with an opening 52 in the aft body. Insert 54 may be provided to extend between fore and aft bodies 24, 26, and into aft body opening 52. Insert 54 facilitates thread 64 engagement and antirotation of fastener 49 and preserves threaded features in the aft body 26. Damaged, worn, or oxidized fasteners 49 or inserts 54 can be removed and replaced while leaving forward and aft bodies 24, 26 intact and capable of being reused with replacements fasteners 48 or inserts 54. In some embodiments, the fastening direction could be reversed so that the fasteners 49 are first inserted through the aft opening 52 and axially forward through the fore opening 50, with threads 64 of the insert 54 extending into the fore opening 50. In this embodiment, fastener 49 may be sized and threaded to engage corresponding threads 64 on the insert 54.

In a method of assembling the shroud segment 22, each of the attachment pins 28, pilot features 44, and axial stop pins 38 may be press fit or otherwise coupled in respective aft body receivers 32, 46, 36. In some embodiments, insert 54, is coupled to extend into an opening 52. Blade track segment 40 may be positioned relative to fore body 24 so that the attachment posts 56, 58 extend into cavity 62.

Optionally one or more seal elements (not shown) is positioned on a radially outer surface of the blade track segment 40 for sealing engagement between the blade track segment 40 and the fore and aft bodies 24, 26. Aft body 26 may be axially moved toward fore body 24 so that the pilot feature 44 extends through the fore body pilot receiver 48, attachment feature extends through the eyelet 34 and subsequently into the receiver 30, and axial stop pin 38 contacts wall 60 of attachment posts 56, preventing further axial movement toward the fore body 24. Subsequently, fastener 49 may be inserted through openings 50, 52 and insert 54 to fasten the fore body 24 to the aft body 26.

In CMC, high-pressure seals segments, the space claim associated with these components within a turbine engine is at a premium. Therefore, there is a need to dispose a CMC high-pressure seals segments in a turbine section in a compact manner. Previous large pin attachments have drawbacks including a relatively large axial space requirement associated with bolt heads, nuts, and minimum threaded length requirements as well as axial carrier material required to support spot faces for fastener interfaces. In the large pin attachments, there are minimum threaded length requirements for bolt tension in order to provide an effective seal against heat. This seal becomes less effective over the bolt life. One of the drawbacks of a large pin design is the need to seal all through-holes associated with the fasteners to satisfy secondary airflow requirements.

In smaller engines, accommodating space requirements for large pin through-bolt assemblies is a challenge. However, the large pin attachment assembly cannot be used in a smaller axial space as the CMC attachment features would have to become prohibitively small, and would drive attachment stresses to unacceptable maximums.

Therefore, as disclosed, the large pin through-bolt connection is replaced by an axially-captured close tolerance, tight limit, or press fit attachment pin in a multi-piece carrier assembly. This assembly alleviates the axial space claim requirements. Additionally, the assembly reduces the total number of sealed interfaces required by the through-bolts in the state of the art and replaces them with fewer larger fasteners as disclosed in FIGS. 5-8.

While the disclosed reduction in axial space claim is provided in the disclosure by an axially segmented multi-piece carrier, it may also be accomplished via a circumferentially segmented carrier as well with first and second bodies circumferentially aligned. The disclosed embodiments describe a fore and aft body of a carrier that is joined via a press fit. This permits a single continuous precision grinding operation to from the mating faces which decreases manufacturing time and cost required to achieve necessary machining tolerances and accuracy. Alternatively, a gasket may be provided in a recess formed in one of the bodies that interfaces with a surface of the aft body.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising:
    a blade track segment that includes a runner that extends circumferentially partway around a central axis and a first attachment post that extends radially outward from the runner,
    a carrier having a first body and a second body coupled together and the carrier coupled with the first attachment post to support the blade track segment relative to the central axis, and
    a mount assembly including an axial positioning member that is engaged with the second body of the carrier and abuts a radially extending and axial facing wall of the first attachment post of the blade track segment to maintain axial spacing between the first body, the second body, and the blade track segment.

2. The turbine shroud of claim 1, wherein the mount assembly further includes an attachment pin that extends axially through the first attachment post.

3. The turbine shroud of claim 2, wherein the axial positioning member extends substantially axially away from the second body to abut the radially extending and axial facing wall of the first attachment post.

4. The turbine shroud of claim 3, wherein the axial positioning member is circumferentially aligned with the attachment pin.

5. The turbine shroud of claim 4, wherein the first body is formed to define a first seal channel that opens radially inwardly and extends circumferentially in the first body and the second body is formed to define a second seal channel that opens radially inwardly and extends circumferentially in the second body.

6. The turbine shroud of claim 1, wherein the axial positioning member is received in the second body.

7. The turbine shroud of claim 1, wherein the axial positioning member includes an axial stop pin.

8. The turbine shroud of claim 7, wherein the first body and the second body are coupled together at mating faces of the first body and the second body.

9. The turbine shroud of claim 7, wherein the blade track segment further includes a second attachment post that extends radially from the runner and the second attachment post is spaced apart circumferentially from the first attachment post.

10. A turbine shroud comprising:
- a blade track segment that includes a runner that extends circumferentially partway around a central axis and an attachment post that extends radially from the runner,
- a carrier coupled with the attachment post to support the blade track segment relative to the central axis, the carrier including a first flange that extends radially inward toward the central axis and a second flange that extends radially inward toward the central axis, the second flange being spaced apart axially from the first flange to locate the attachment post included in the blade track segment axially between the first flange and the second flange, and
- a mount assembly including an axial positioning member that engages the carrier and abuts a radially extending and axial facing wall of the attachment post of the blade track segment to axially locate the blade track segment relative to the carrier.

11. The turbine shroud of claim 10, wherein the axial positioning member engages the second flange and extends substantially axially away from the second flange to abut the radially extending and axial facing wall of the attachment post.

12. The turbine shroud of claim 10, wherein the mount assembly further includes an attachment pin that extends axially through the attachment post, the axial positioning member extends only partway circumferentially about the central axis, and the axial positioning member is aligned circumferentially with the attachment pin.

13. The turbine shroud of claim 10, wherein the first flange is formed to define a first seal channel that opens radially inwardly and extends circumferentially in the first flange and the second flange is formed to define a second seal channel that opens radially inwardly and extends circumferentially in the second flange.

14. The turbine shroud of claim 10, wherein the attachment post defines an eyelet that extends axially through the attachment post.

15. The turbine shroud of claim 10, wherein the mount assembly further includes an attachment pin that extends axially through the attachment post and into the carrier to couple the blade track segment with the carrier.

16. The turbine shroud of claim 15, wherein the attachment pin extends into the first flange and into the second flange.

17. The turbine shroud of claim 10, wherein the axial positioning member includes an axial pin that engages the carrier and abuts the radially extending and axial facing wall of the attachment post of the blade track segment.

18. The turbine shroud of claim 17, wherein the axial pin is received in the second flange of the carrier.

19. The turbine shroud of claim 10, wherein the carrier includes a first body and a second body coupled together at mating faces of the first body and the second body, the first body includes the first flange, and the second body includes the second flange.

20. The turbine shroud of claim 10, wherein the blade track segment includes another attachment post spaced apart circumferentially from the attachment post.

* * * * *